(12) United States Patent
Hwang et al.

(10) Patent No.: US 11,506,558 B2
(45) Date of Patent: Nov. 22, 2022

(54) APPARATUS AND METHOD FOR INSPECTING VENTILATION

(71) Applicants: Samsung Electronics Co., Ltd., Gyeonggi-do (KR); DMC Co., Ltd., Gyeonggi-do (KR)

(72) Inventors: Seunghyun Hwang, Gyeonggi-do (KR); Dongeon Kim, Gyeonggi-do (KR); Youngchul Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 16/624,351

(22) PCT Filed: Jun. 15, 2018

(86) PCT No.: PCT/KR2018/006807
§ 371 (c)(1),
(2) Date: Dec. 19, 2019

(87) PCT Pub. No.: WO2018/236095
PCT Pub. Date: Dec. 27, 2018

(65) Prior Publication Data
US 2021/0148777 A1 May 20, 2021

(30) Foreign Application Priority Data

Jun. 21, 2017 (KR) .................. 10-2017-0078764

(51) Int. Cl.
*G01M 3/26* (2006.01)
*G01L 13/06* (2006.01)
(Continued)

(52) U.S. Cl.
CPC .............. *G01L 13/06* (2013.01); *G01F 5/005* (2013.01); *G01M 3/16* (2013.01)

(58) Field of Classification Search
CPC ... G01N 15/08–0893; G01N 2015/0813–0873
See application file for complete search history.

(56) References Cited

U.S. PATENT DOCUMENTS

| 6,182,501 B1 | 2/2001 | Furuse et al. |
| 7,904,259 B2 | 3/2011 | Shinoda |
| (Continued) | | |

FOREIGN PATENT DOCUMENTS

| CN | 101980731 A | 2/2011 |
| CN | 102019687 A | 4/2011 |
| (Continued) | | |

OTHER PUBLICATIONS

English Translation of JP2006138859A (Year: 2006).*
Chinese Search Report dated Jun. 18, 2021.

*Primary Examiner* — Alexander A Mercado
(74) *Attorney, Agent, or Firm* — Cha & Reiter, LLC

(57) ABSTRACT

An apparatus for inspecting a ventilation characteristic according to various embodiments may comprise: a seating unit to which an object to be inspected is attached, and which has a lower surface and an upper surface facing in a direction opposite to the lower surface and includes at least one through-hole passing through the lower surface and the upper surface; a measuring unit which includes a groove for accommodating at least a portion of the seating unit including the lower surface of the seating unit, and a fluid supply passage for supplying a fluid in a direction facing the object to be inspected which is attached to the seating unit; and a compressing unit which is disposed to apply a pressing pressure to the seating unit at a position opposite to the upper surface of the seating unit and includes a fluid discharge passage so that a fluid supplied from the measurement unit is discharged through the object to be inspected. Other embodiments are also possible.

10 Claims, 17 Drawing Sheets

(51) Int. Cl.
*G01F 5/00* (2006.01)
*G01M 3/16* (2006.01)

(56) References Cited

U.S. PATENT DOCUMENTS

| | | |
|---|---|---|
| 8,205,505 B2 | 6/2012 | Chou et al. |
| 2008/0163675 A1 | 7/2008 | Hsu |
| 2009/0192447 A1 | 7/2009 | Andersen et al. |
| 2011/0062368 A1 | 4/2011 | Blochmann |
| 2014/0076032 A1 | 3/2014 | Wu |
| 2016/0075915 A1 | 3/2016 | Dutta et al. |
| 2019/0339157 A1* | 11/2019 | Stauffer .............. G01M 3/3281 |

FOREIGN PATENT DOCUMENTS

| | | |
|---|---|---|
| JP | 2000-88736 A | 3/2000 |
| JP | 2006-138859 A | 6/2006 |
| KR | 10-1457075 B1 | 10/2014 |
| KR | 10-2016-0052217 A | 5/2016 |

\* cited by examiner

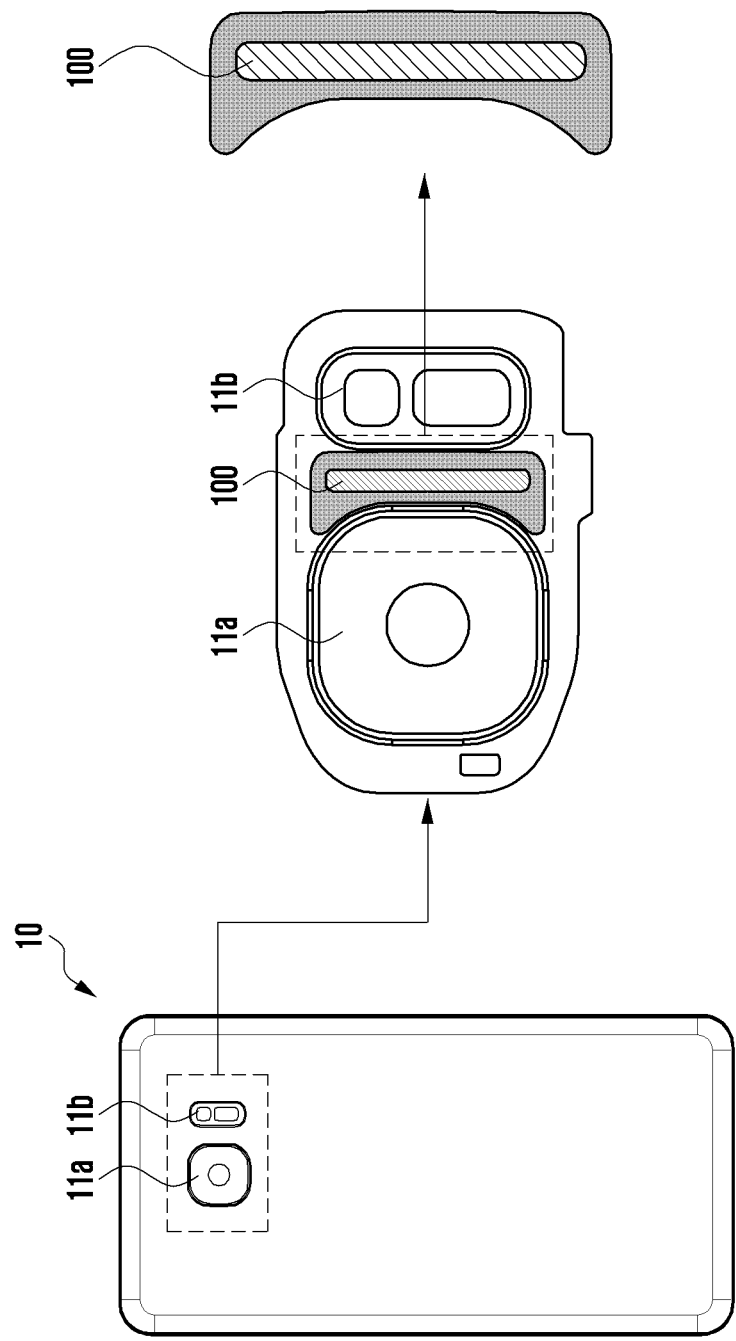

APPARATUS AND METHOD FOR INSPECTING VENTILATION

CROSS REFERENCE TO RELATED APPLICATIONS

This application is a National Phase Entry of PCT International Application No. PCT/KR2018/006807, which was filed on Jun. 15, 2018, and claims a priority to Korean Patent Application No. 10-2017-0078764, which was filed on Jun. 21, 2017, the contents of which are incorporated herein by reference.

TECHNICAL FIELD

Various embodiments of the disclosure relate to an apparatus for inspecting a ventilation characteristic of an inspection object.

BACKGROUND ART

Electronic devices have evolved to provide more convenience to users while implementing advanced performance. The electronic devices may be used in various environments. In particular, a situation in which water flows into an electronic device from the outside may occur. When water flows into an electronic device, a failure of an internal electronic component that is vulnerable to water may be caused, and thus an electronic device supporting a waterproof function is required.

As for the electronic device supporting the waterproof function, a housing made of a waterproof material may be used in order to prevent water from flowing into internal electronic components. However, if the ventilation of the external and internal electronic components of an electronic device is completely blocked for waterproofing, since the internal pressure and the external pressure of the electronic device are not balanced, a failure of the electronic device may occur, and thus it is necessary to provide an air vent for ventilation between the outside and inside of the electronic device.

DISCLOSURE OF INVENTION

Technical Problem

A material used for air vent for ventilation between the outside and the inside of an electronic device requires an appropriate level of ventilation characteristic. For example, the material used for the air vent of the electronic device supporting the waterproof function may require a ventilation characteristic such that the electronic device is not permeable by water but is permeable by air molecules.

Although the air vent of an electronic device is only an area of 1 cm$^2$ or less, in general, a raw material, of which the ventilation characteristic is examined, is inspected over an area of several hundred cm$^2$. Accordingly, even if the ventilation characteristic is satisfied in a row material unit, there is a problem that it is impossible to identify whether the ventilation characteristic is satisfied even in a small area used in an actual electronic device.

Various embodiments of the disclosure may provide a method and an apparatus capable of inspecting ventilation performance without causing a ventilation volume characteristic error due to an area difference between air vent materials applied to actual electronic devices.

Solution to Problem

A ventilation characteristic inspection apparatus according to various embodiments may include: a seating unit configured to attach an inspection object thereto, and including a lower face, an upper face facing in a direction opposite the lower face, and at least one through-hole passing through the lower face and the upper face; a measurement unit including a groove configured to accommodate at least a portion of the seating unit including the lower face of the seating unit, and a fluid supply flow path configured to supply a fluid in a direction facing the inspection object attached to the seating unit; and a compressing unit disposed to apply a pressing pressure to the seating unit at a position facing the upper face of the seating unit, and including a fluid discharge flow path such that a fluid supplied from the measurement unit is discharged through the injection object.

Advantageous Effects of Invention

According to various embodiments of the disclosure, since the inspection apparatus is capable of inspecting a ventilation characteristic of an inspection object in an area used for an actual electronic device, it is possible to inspect ventilation performance without causing a ventilation volume characteristic error due to an area difference between an air vent material to be inspected and an air vent material to be applied to an actual electronic device.

BRIEF DESCRIPTION OF DRAWINGS

FIG. 1 is a view schematically illustrating an air vent 100 of an electronic device 10 according to various embodiments;

MODE FOR THE INVENTION

Figure 2A:
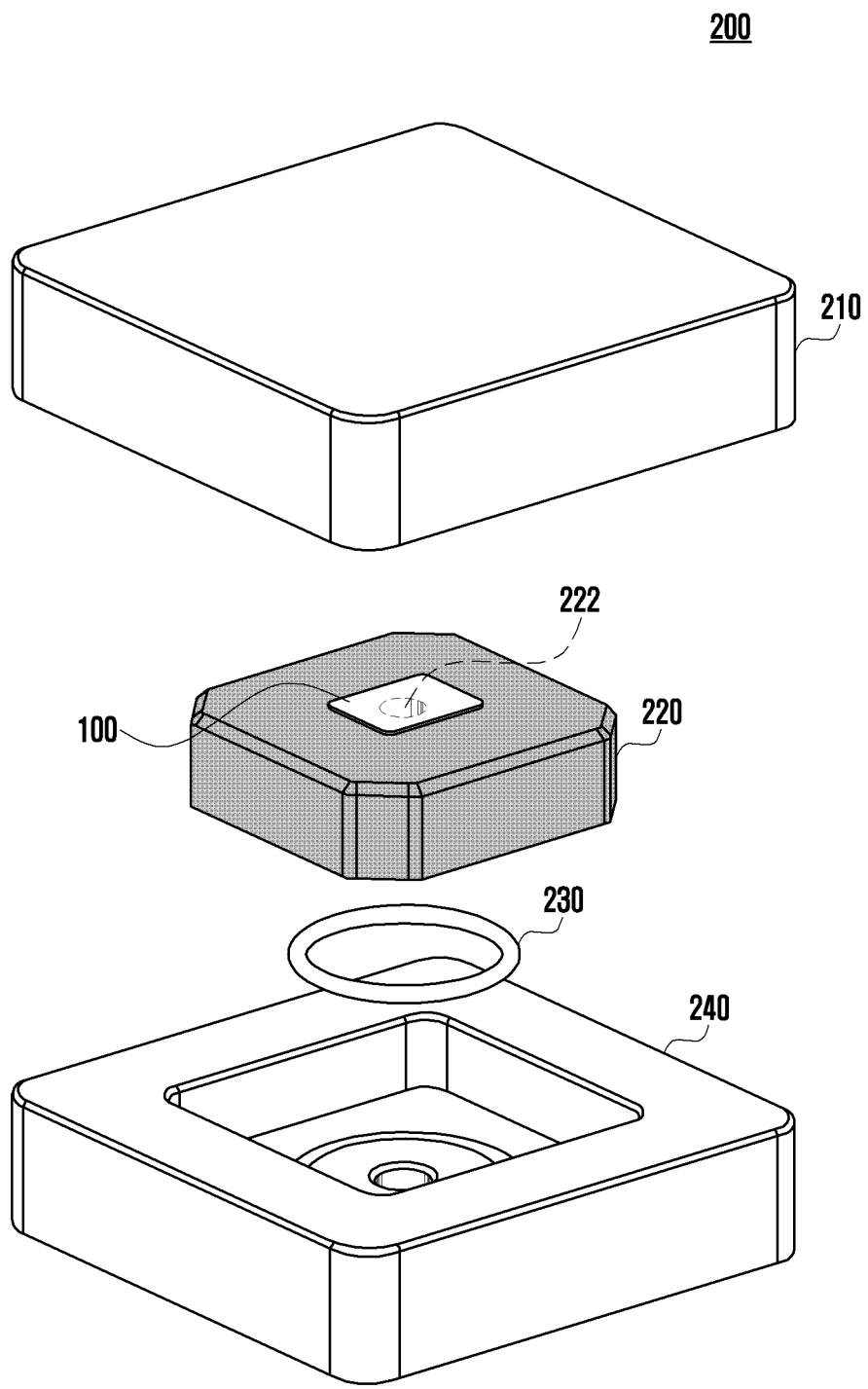
FIG. 2A is an exploded perspective view of a ventilation characteristic inspection apparatus 200 according to an embodiment when viewed from above.

Hereinafter, the disclosure is described with reference to the accompanying drawings. Although specific embodiments are illustrated in the drawings and related detailed descriptions are discussed in the specification, the disclosure may have various modifications and several embodiments. However, various embodiments of the disclosure are not limited to a specific implementation form and it should be understood that the disclosure includes all changes and/or equivalents and substitutes included in the spirit and scope of various embodiments of the disclosure. In connection with descriptions of the drawings, similar components are designated by the same reference numeral.

In the disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in the disclosure may modify various components of the various embodiments but does not limit the corresponding components. The expressions may be used to distinguish between one component and another component. For example, the above expressions do not limit the sequence and/or importance of the components. The expressions may be used for distinguishing one component from other components. For example, a first user device and a second user device indicate different user devices although both of them are user devices. For example, without departing from the scope of the disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

In the disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

It should be appreciated that various embodiments of the disclosure and the terms used therein are not intended to limit the technological features set forth herein to particular embodiments and include various changes, equivalents, or replacements for a corresponding embodiment. Unless otherwise defined herein, all terms including technical or scientific terms used herein have the same meanings as commonly understood by those skilled in the art to which the disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Each of the above-described component elements of hardware according to the disclosure may be configured with one or more components, and the names of the corresponding component elements may vary based on the type of electronic device. The electronic device according to various embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

FIG. 1 is a view schematically illustrating an air vent 100 of an electronic device 10 according to various embodiments.

According to various embodiments, the electronic device 10 may support a waterproof function. The electronic device 10 may use a housing having waterproof performance in order to support the waterproof function, and a minute gap in the outer face of the electronic device 10 may be sealed using a waterproof material such as waterproof tape.

When ventilation between the outside and the internal electronic components of the electronic device 10 is completely blocked, a failure of the electronic device 10 may occur due to a pressure difference between the inside and the outside of the electronic device 10. For example, when the electronic device 10 is located in an area in which the external pressure is low (for example, a mountain), when the air therein expands due to heat generation of an internal component, or when a user applies a pressure to the electronic device in the manner of holding or pressing the electronic device 10, a failure of the component may be caused due to the increase of the internal pressure of the electronic device.

The electronic device 10 may include a space for venting 100 (hereinafter, referred to as an "air vent") in order to achieve pressure balance between the outside and the inside of the electronic device 10 in at least a partial area thereof. For example, as illustrated in FIG. 1, the air vent 100 may be located in a partial area between a camera 11a and an LED module 11b on the rear side of the electronic device 10. The internal air of the electronic device 10 may flow out of the electronic device 10 through the air vent 100, and air from the outside of the electronic device 10 may flow into the inside of the electronic device 10.

The position of the air vent 100 illustrated in FIG. 1 is merely an example, and various numbers of air vents 100 may be provided at various positions in the outer face of the electronic device 10.

FIGS. 2A to 2D are exploded perspective views of a ventilation characteristic inspection apparatus 200 according to various embodiments.

Figure 2B:
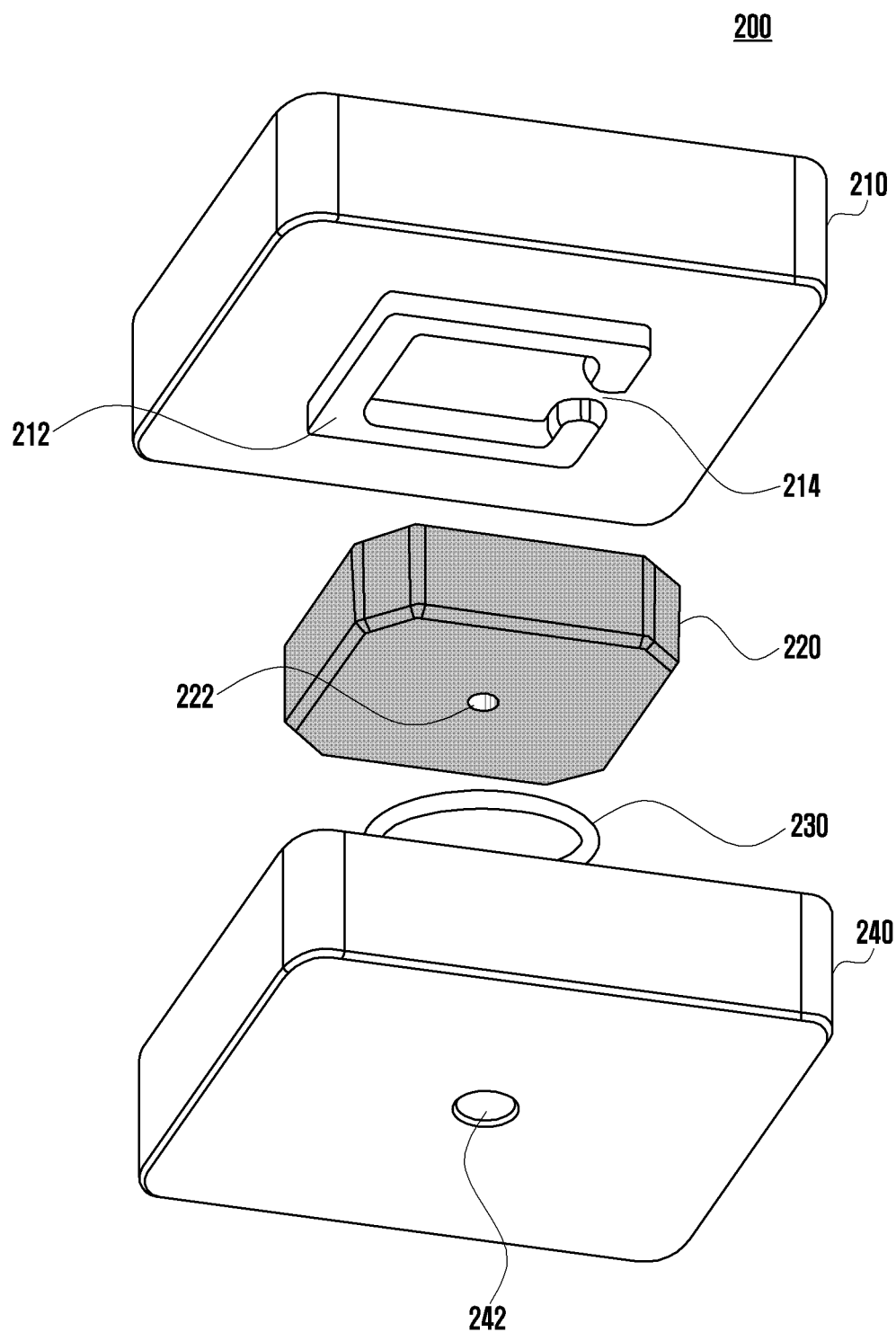
FIG. 2B is an exploded perspective view of the ventilation characteristic inspection apparatus 200 according to the embodiment when viewed from below.

FIG. 2A is an exploded perspective view of a ventilation characteristic inspection apparatus 200 according to an embodiment when viewed from above, and FIG. 2B is an exploded perspective view of the ventilation characteristic inspection apparatus 200 of FIG. 2a when viewed from below.

Figure 2C:
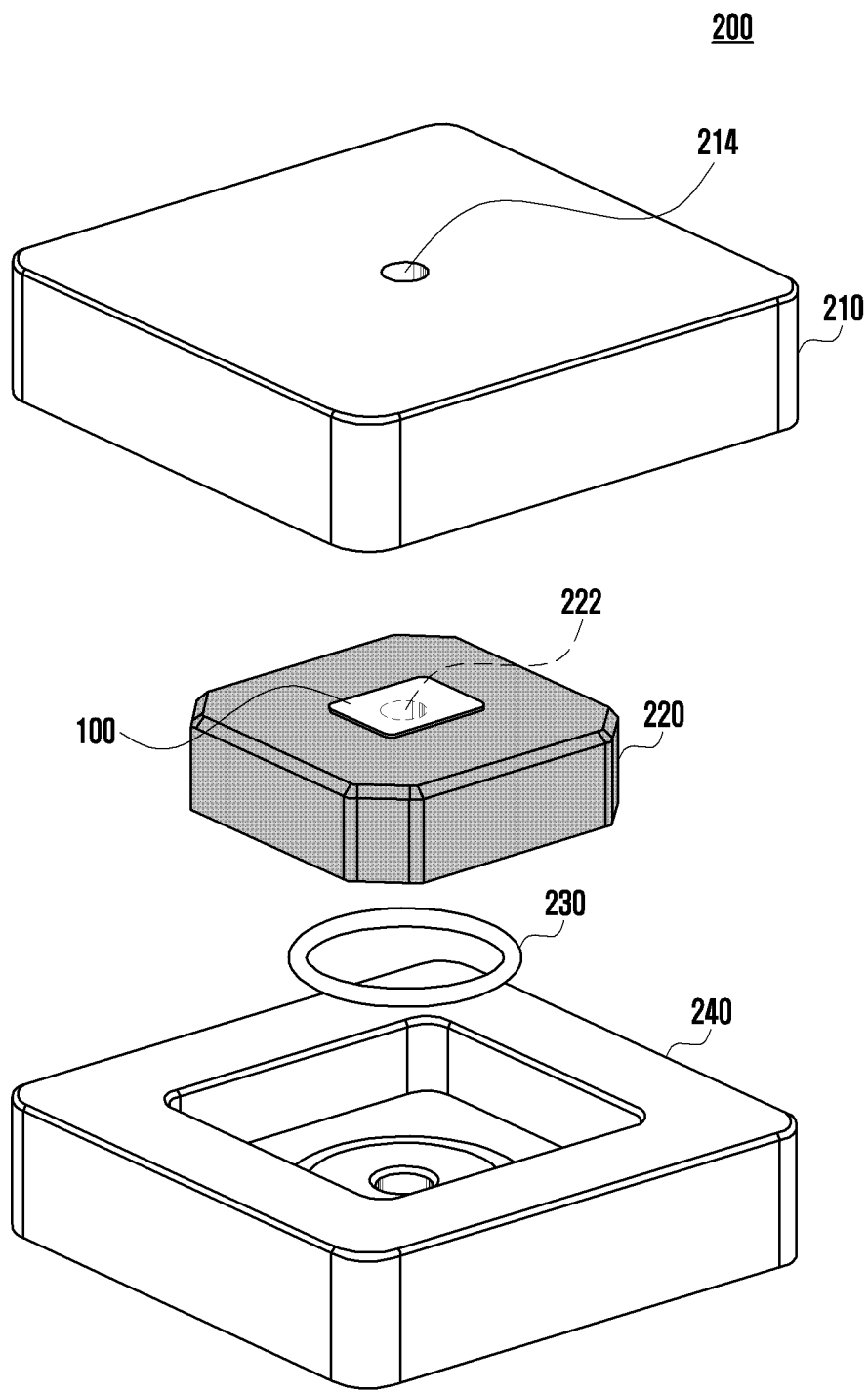
FIG. 2C is an exploded perspective view of a ventilation characteristic inspection apparatus 200 according to an embodiment when viewed from above.

FIG. 2C is an exploded perspective view of the ventilation characteristic inspection apparatus 200 according to another embodiment when viewed from above, and FIG. 2B is an exploded perspective view of the ventilation characteristic inspection apparatus 200 of FIG. 2c when viewed from below.

According to various embodiments, the ventilation characteristic inspection apparatus 200 is an apparatus for inspecting the ventilation performance of a material used for the air vent 100 of the electronic device 10, and may include a compressing unit 210, a seating unit 220, a sealing unit 230, and a measurement unit 240.

The ventilation characteristic inspection apparatus 200 may inspect the ventilation performance of the material used for the air vent 100. For example, the ventilation characteristic inspection apparatus 200 may inspect whether or not the material used for the air vent 100 has an appropriate ventilation volume characteristic that does not allow water to pass therethrough but allows air to pass therethrough.

According to various embodiments, a material used for the air vent 100 to be inspected (hereinafter, an "inspection object 100") may be inspected in the state of being attached to one face of the seating unit 220 of the ventilation characteristic inspection apparatus 200.

According to various embodiments, as illustrated in FIGS. 2A to 2D, the ventilation characteristic inspection apparatus 200 may be configured in the form in which the compressing unit 210, the seating unit 220, and the measurement unit 240 are sequentially arranged.

According to various embodiments, the seating unit 220 may include at least one through hole 222. For example, the through hole 222 may be formed in the center of the seating unit 220.

Figure 4A:
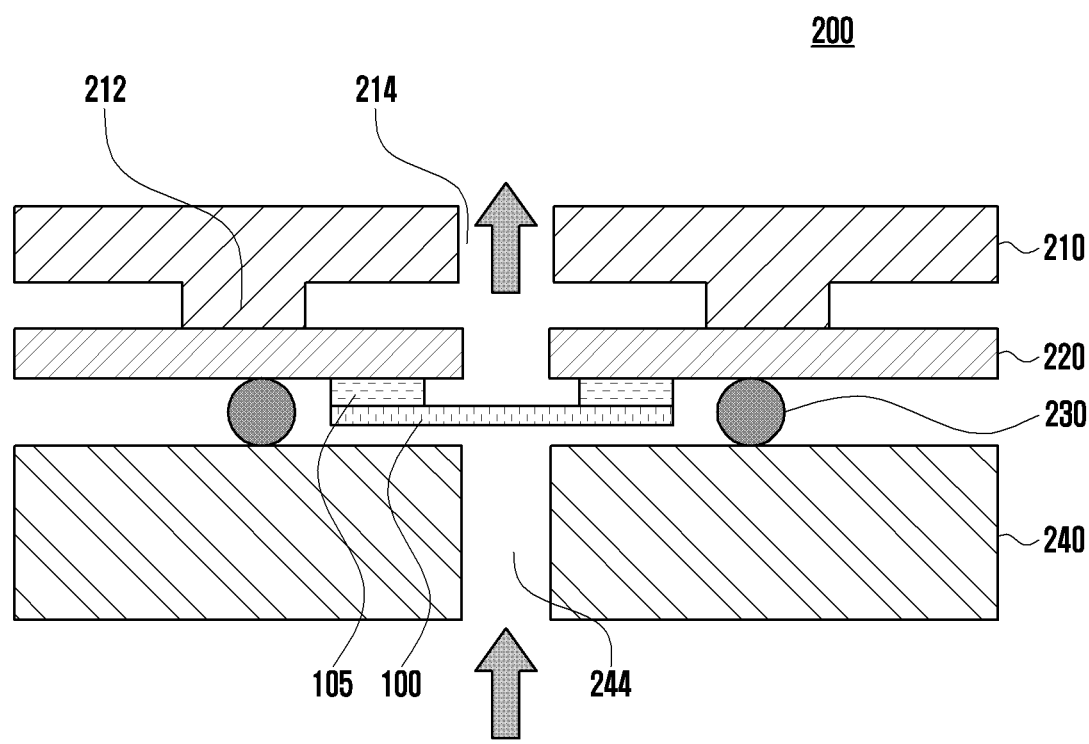
FIG. 4A is a view for explaining a moving direction of a fluid discharged to the upper side of the compressing unit in the ventilation characteristic inspection apparatus 200 configured to attach an inspection object to the lower face of the seating unit according to one embodiment.
Figure 4B:
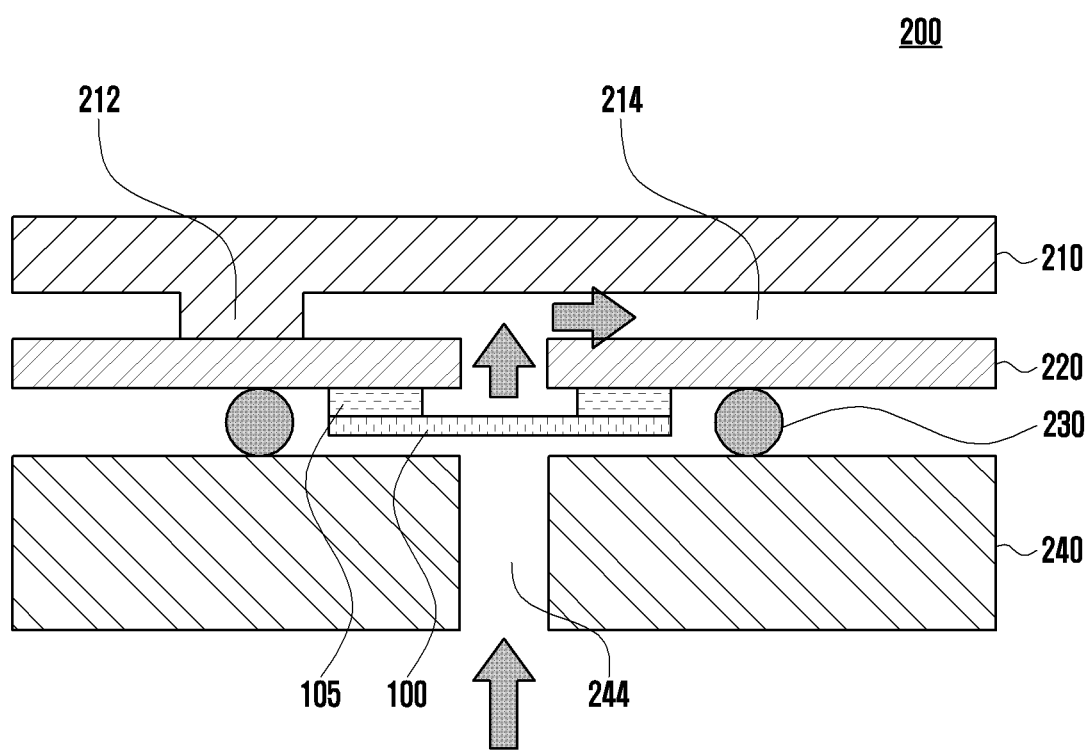
FIG. 4B is a view for explaining a moving direction of a fluid discharged to the lateral side of the compressing unit in the ventilation characteristic inspection apparatus 200 configured to attach an inspection object to the lower face of the seating unit according to one embodiment.

According to various embodiments, the inspection object 100 may be attached to one face of the seating unit 220 to correspond to the through hole 222. According to an embodiment, the inspection object 100 may be attached to one face of the seating unit 220 to face the compressing unit 210, as illustrated in FIGS. 2A and 2C. According to various embodiments, as illustrated in FIGS. 4A and 4B, the inspection object 100 may be attached to one face of the seating unit 220 and may be oriented in a direction facing one face of the measurement unit 240.

According to various embodiments, the sealing unit 230 may be disposed between the seating unit 220 and the measurement unit 240.

For example, when a fluid is introduced from the measurement unit 240, the fluid introduced into the ventilation characteristic inspection apparatus 200 may move along the through hole 222 of the seating unit 220 from the measurement unit 240. The sealing unit 230 may bring the seating unit 220 and the measuring unit 240 into close contact with each other such that the fluid does not leak into an area other than the through hole 222.

According to various embodiments, the sealing unit 230 may be made of an elastic material in order to prevent the fluid from leaking into the space between the seating unit 220 and the measurement unit 240 by an elastic force. For example, the sealing unit 230 may be formed of natural rubber, synthetic rubber, or synthetic resin. According to various embodiments, the sealing unit 230 may be an O-ring or a gasket.

According to an embodiment, the measuring unit 240 may further include a sealing groove (e.g., an O-ring groove) in a face facing the seating unit 220 in order to guide the position of the sealing unit 230 and to more effectively bring the seating unit 220 and the measuring unit 240 into close contact with each other.

According to various embodiments, the compressing unit 210 may be disposed such that at least one face thereof faces the seating unit 220. For example, the compressing unit 210 may serve to press the seating unit 220 on the side opposite the face of the seating unit 220, which faces the measurement unit 240.

Figure 2D:
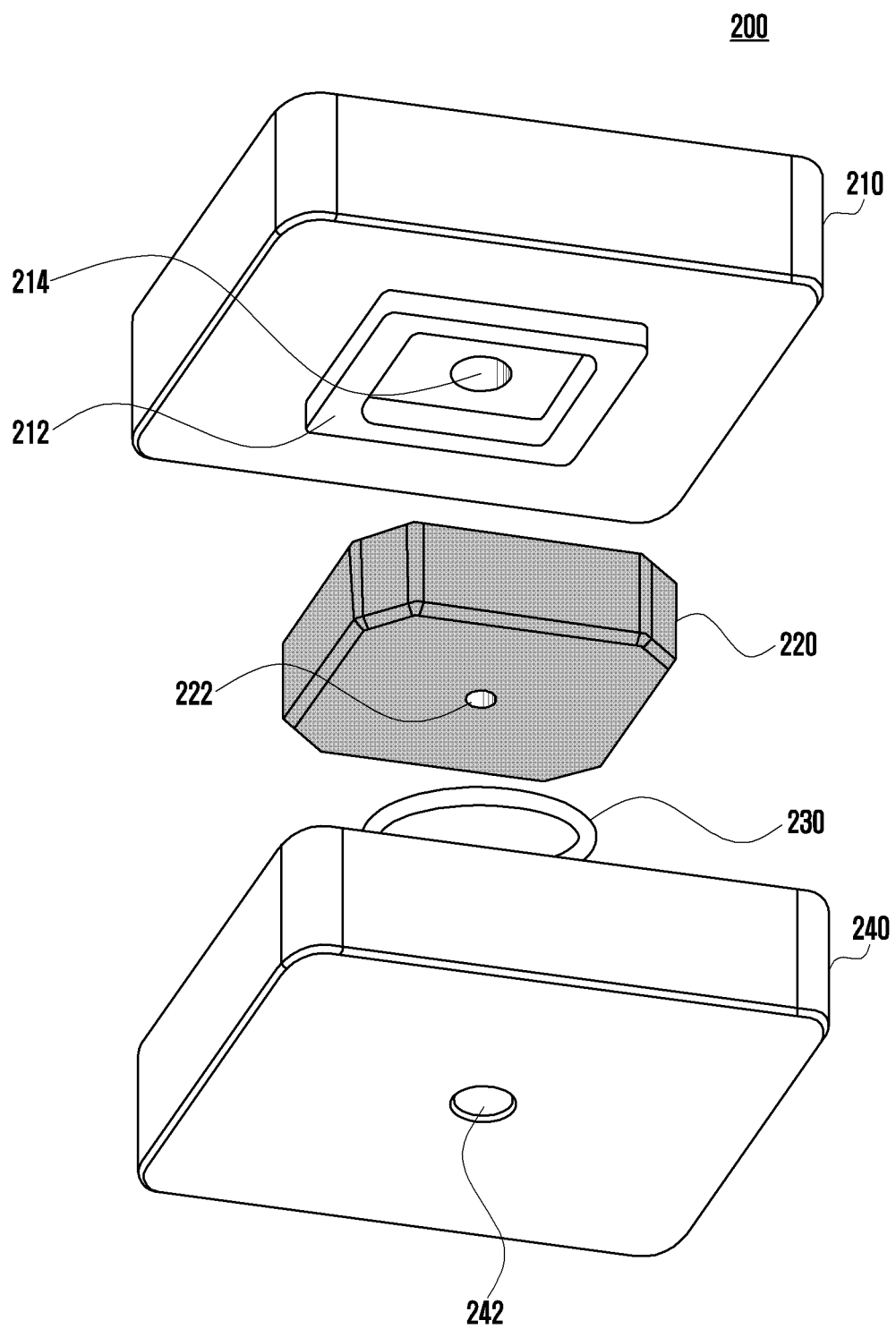
FIG. 2D is an exploded perspective view of the ventilation characteristic inspection apparatus 200 according to the embodiment when viewed from below.

According to various embodiments, as illustrated in FIGS. 2B and 2D, the compressing unit 210 may include a protrusion 212 formed to protrude towards the seating unit 220. According to an embodiment, as illustrated in FIG. 2B, the compressing unit 210 may include an open area 214 at one side of the protrusion 212. According to another embodiment, as illustrated in FIG. 2d, the compressing unit 210 may include a hole area 214 through the upper and lower faces of the compressing unit 210.

Figure 3A:
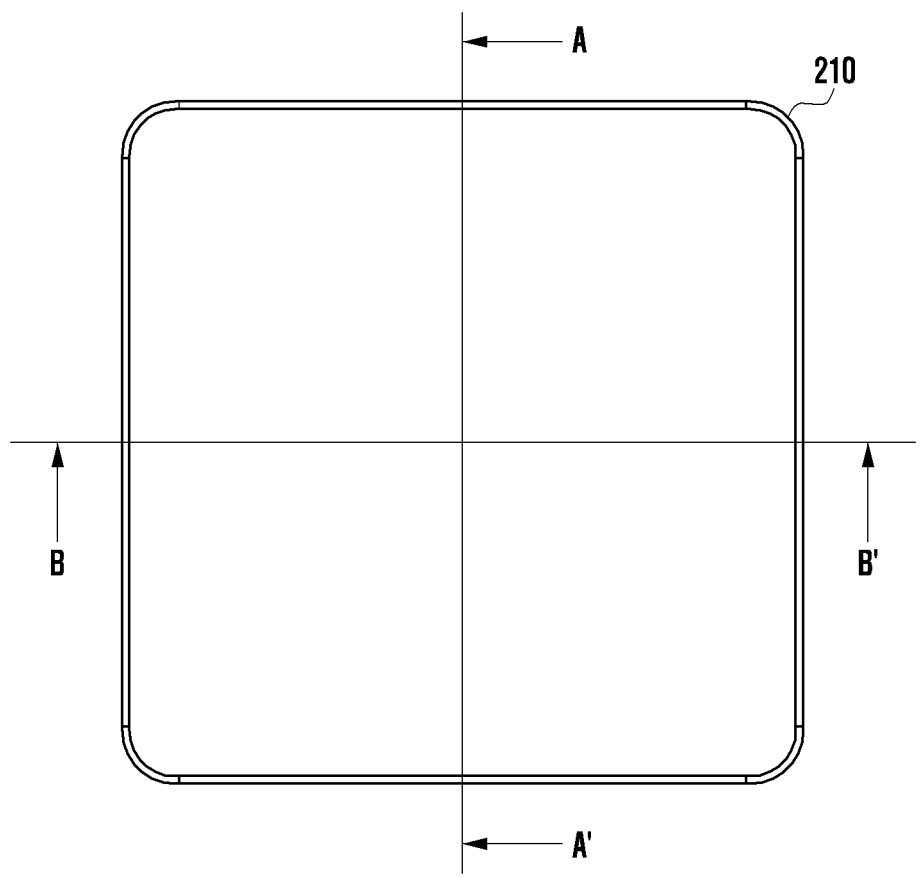
FIG. 3A is a top plan view of the ventilation characteristic inspection apparatus 200 according to an embodiment when viewed from above.
Figure 3B:
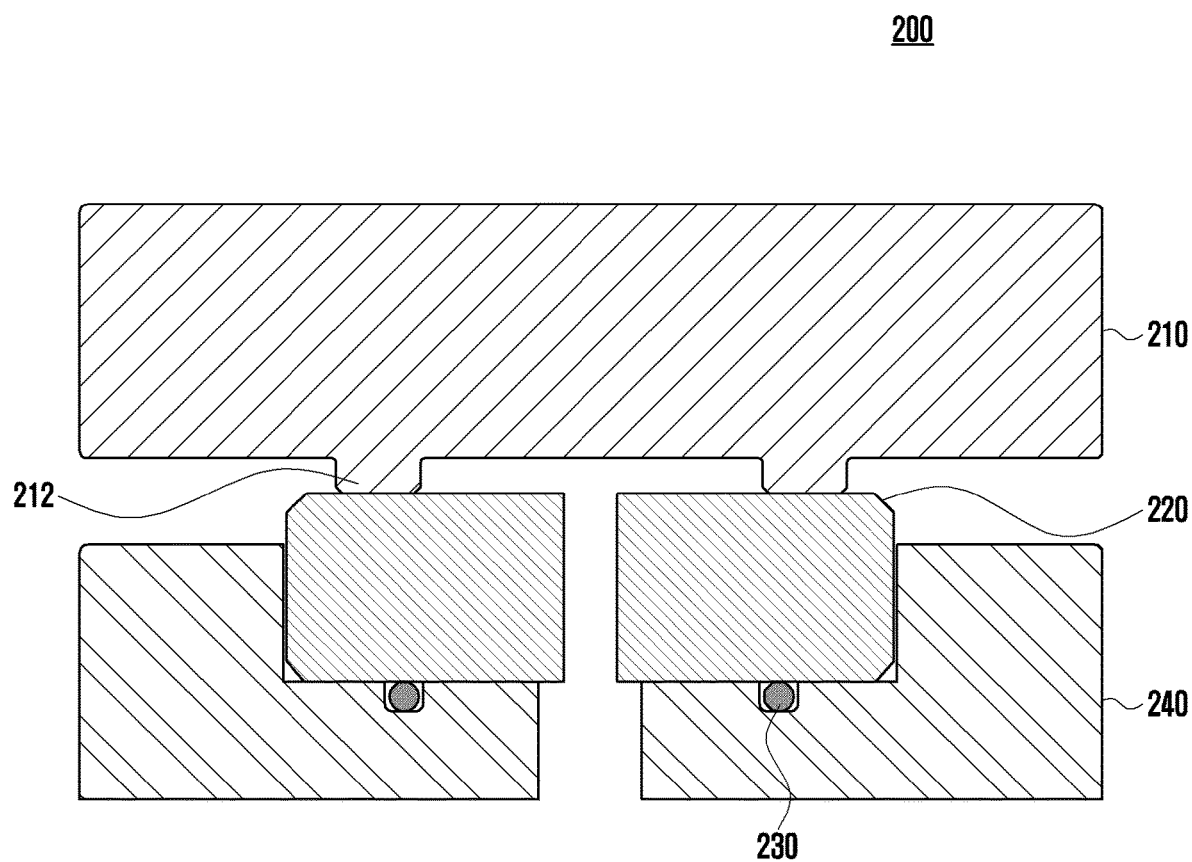
FIG. 3B is a cross-sectional view of the ventilation characteristic inspection apparatus 200 of FIG. 3A taken along A-A' plane.
Figure 3C:
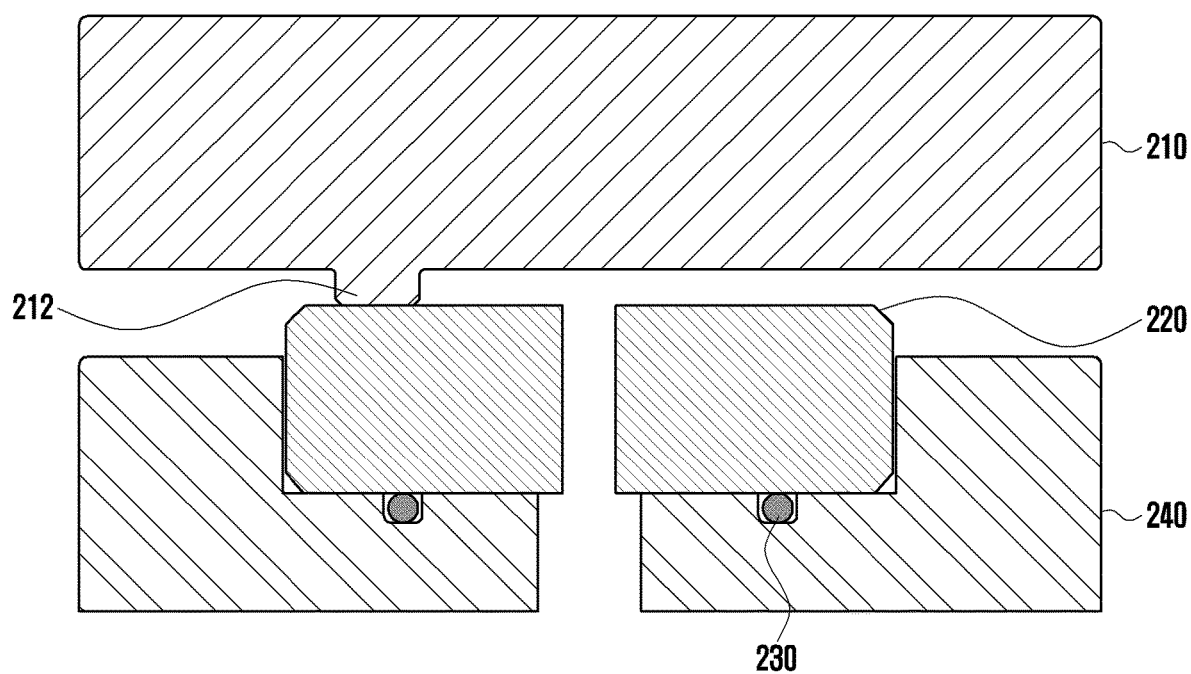
FIG. 3C is a cross-sectional view of the ventilation characteristic inspection apparatus 200 of FIG. 3A taken along B-B' plane.

FIGS. 3A to 3C are views for explaining in detail the shape of the compressing unit 210 in the ventilation characteristic inspection apparatus 200 according to an embodiment.

FIG. 3A is a top plan view of the ventilation characteristic inspection apparatus 200 according to an embodiment, and FIGS. 3B and 3C are cross-sectional views taken in the A-A' and B-B' directions of FIG. 3A, respectively.

Referring to FIGS. 3A to 3C, for example, the protrusion 212 may be formed in a C shape (or a ⌐ shape, a V shape, or the like) to correspond to the position of the through hole 222 in order to allow the fluid passing through the through hole 222 of the seating unit 220 to flow along one face thereof.

According to various embodiments, the protrusion 212 may include an open area that serves as an outlet in a side face such that the fluid passing along the through hole 222 of the seating unit 220 is movable in a direction other than the through hole 222.

Figure 3D:
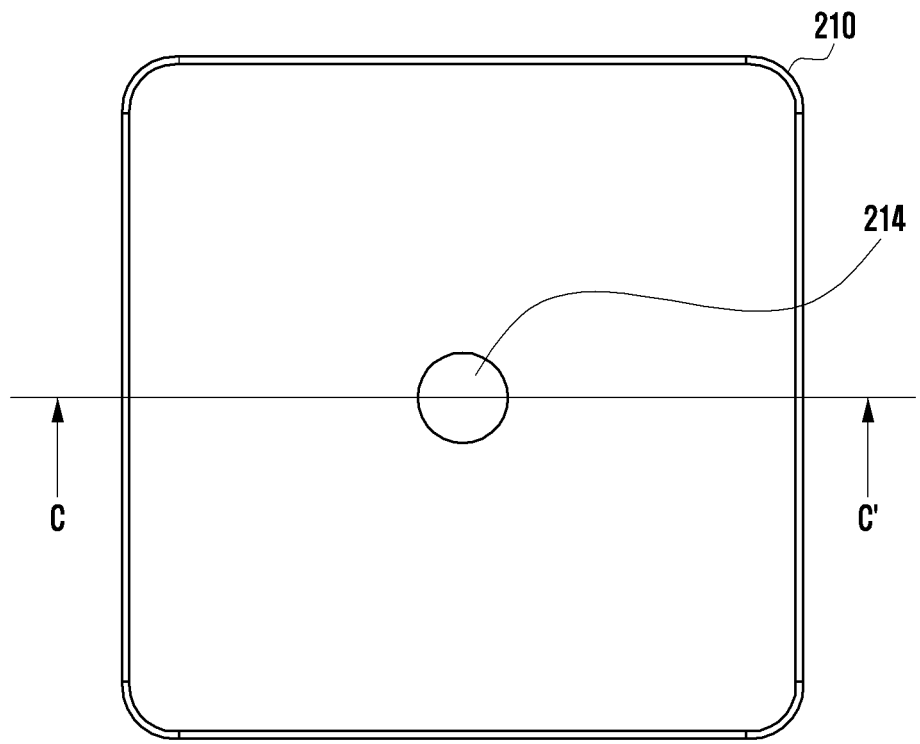
FIG. 3D is a top plan view of a ventilation characteristic inspection apparatus 200 according to another embodiment.
Figure 3E:
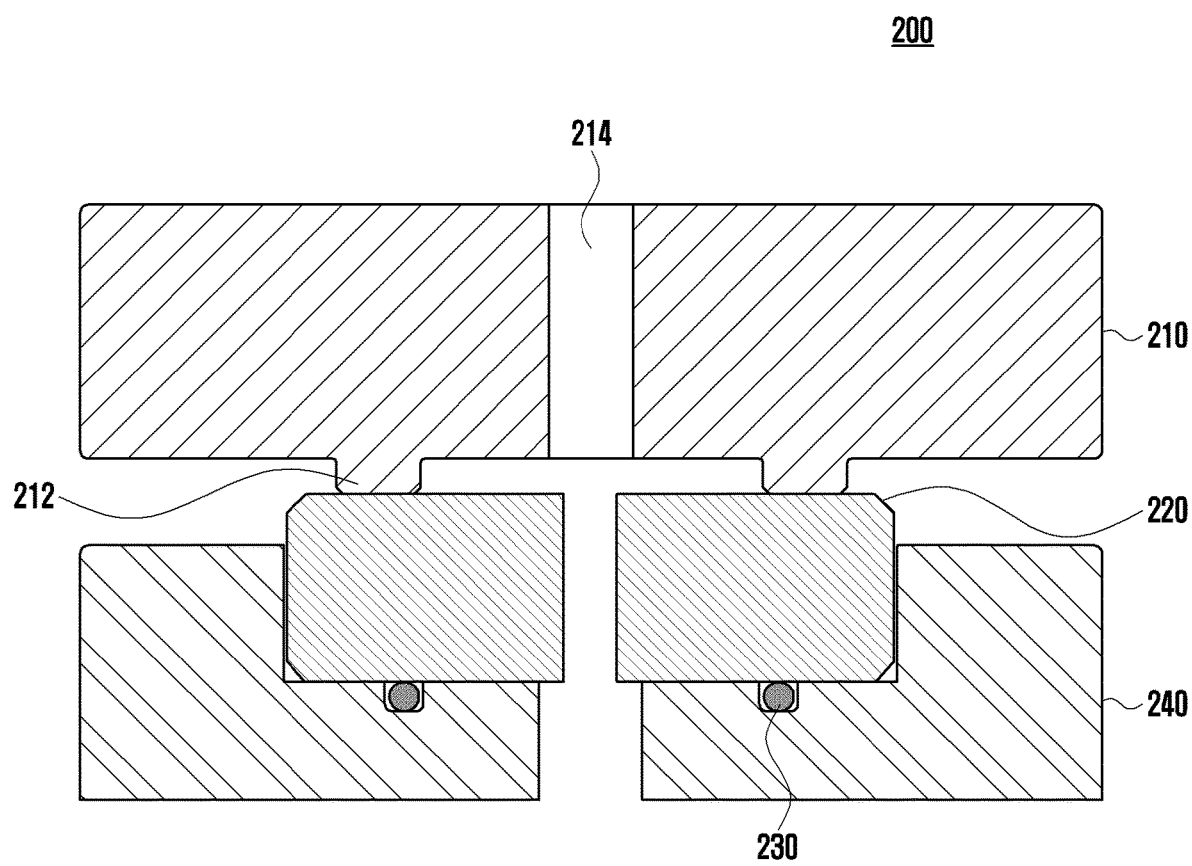
FIG. 3E is a cross-sectional view of the ventilation characteristic inspection apparatus 200 of FIG. 3D taken along C-C' plane.

FIG. 3D is a top plan view of a ventilation characteristic inspection apparatus 200 according to another embodiment, and FIG. 3E is a cross-sectional view taken in the C-C' direction of FIG. 3D.

Referring to 3D and 3E, the protrusion 212 according to another embodiment may be formed in a circle or square shape corresponding to the position of the through hole 222.

According to various embodiments, the compressing unit 210 may further include a separate hole area 214 through the upper and lower faces of the compressing unit 210 to correspond to the through hole 222 of the seating unit 220. The hole area 214 of the compressing unit 210 may serve as an outlet to allow the fluid, passing along the through hole 222 of the seating unit 220, to exit to the upper side of the compressing unit 210.

According to various embodiments, the protrusion 212 may be formed at a position where the protrusion 212 presses the seating unit 220 towards the measurement unit 240 but does not come into direct contact with the inspection object 100 even when the inspection object 100 is attached to the upper face of the seating unit 220 and is inspected.

According to another exemplary embodiment, the compressing unit 210 may not include the protrusion 212, but may include a groove (not illustrated) that follows the shape of the seating unit 220. For example, the compressing unit 210 may press the seating unit 220 towards the measurement unit 240 by the groove (not illustrated). The compressing unit 210 may further include a separate hole area through which the fluid passing along the through hole 222 of the seating unit 220 may exit.

According to various embodiments, the measurement unit 240 may supply a fluid (e.g., air) into the ventilation characteristic inspection apparatus 200.

According to various embodiments, the measurement unit 240 may measure flow rate information of the fluid passing through the inspection object 100 attached to one face of the seating unit 220. For example, the flow rate information of the fluid passing through the inspection object 100 measured by the measurement unit 240 may be the flow rate information of the fluid flowing into the inspection object 100 before passing through the inspection object 100, or the flow rate information of the fluid flowing out of the inspection object 100 after passing through the inspection object 100. The measurement unit 240 may determine whether or not the aeration characteristic of the inspection object 100 is poor using flow rate information of the fluid passing through the inspection object 100.

FIGS. 4A, 4B, 5A, and 5B are side views each for explaining a moving direction of a fluid in the air permeability characteristic inspection apparatus 200 according to various embodiments.

FIGS. 4A and 4B illustrate an apparatus 200 that performs a ventilation characteristic inspection in the state in which an inspection object 100 is attached to the lower face of the seating unit 220, that is, the face of the seating part 220 facing the measurement unit 240.

According to various embodiments, the inspection object 100 may be attached to the lower face of the seating unit 220, which faces the measurement unit 240. For example, the inspection object 100 may be attached to one face of the seating unit 220 using an adhesive member (e.g., double-sided tape) 105. The adhesive member 105 may be, for example, the same type as the material used when the inspection object 100 is attached to the electronic device 10 as an air vent.

According to various embodiments, when the inspection object 100 is attached to the lower face of the seat unit 220 and the ventilation characteristic of the inspection object 100 is inspected, the fluid supplied from the measurement unit 240 may be a fluid compressed to have a specific pressure higher than the external atmospheric pressure. Thus, the ventilation characteristic of the inspection object 100 may be determined assuming the case in which the internal pressure of the electronic device 10 is higher than the external atmospheric pressure.

Figure 5A:
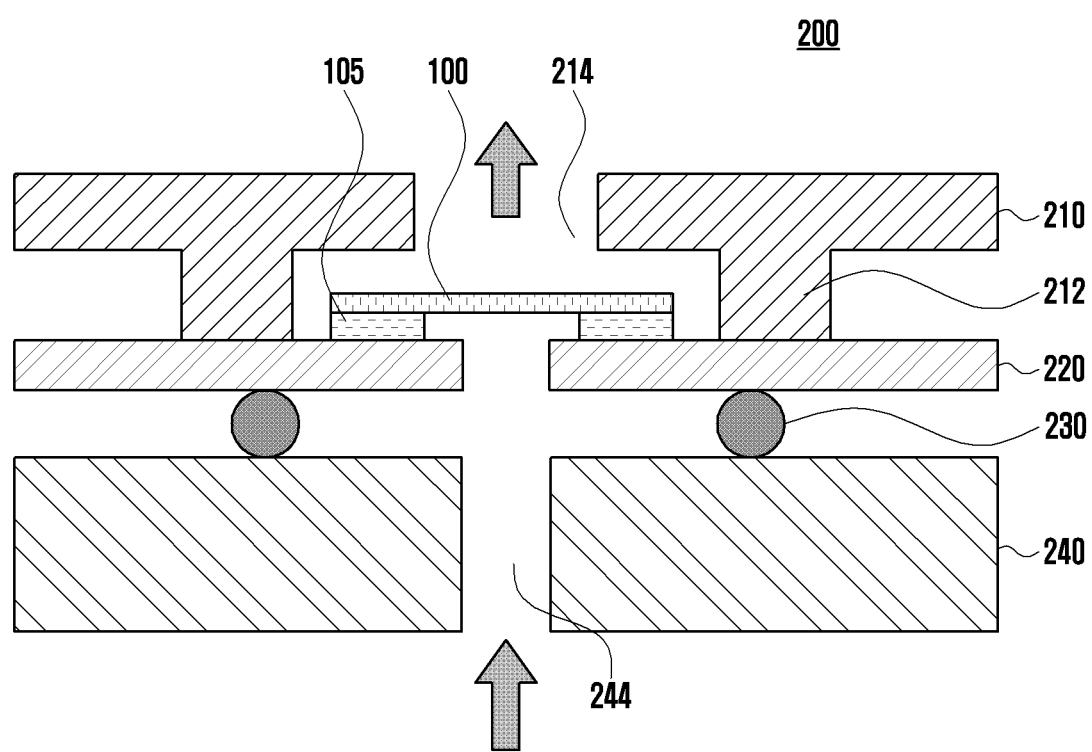
FIG. 5A is a view for explaining a moving direction of a fluid discharged to the upper side of the compressing unit in the ventilation characteristic inspection apparatus 200 configured to attach an inspection object to the upper face of the seating unit according to one embodiment.
Figure 5B:
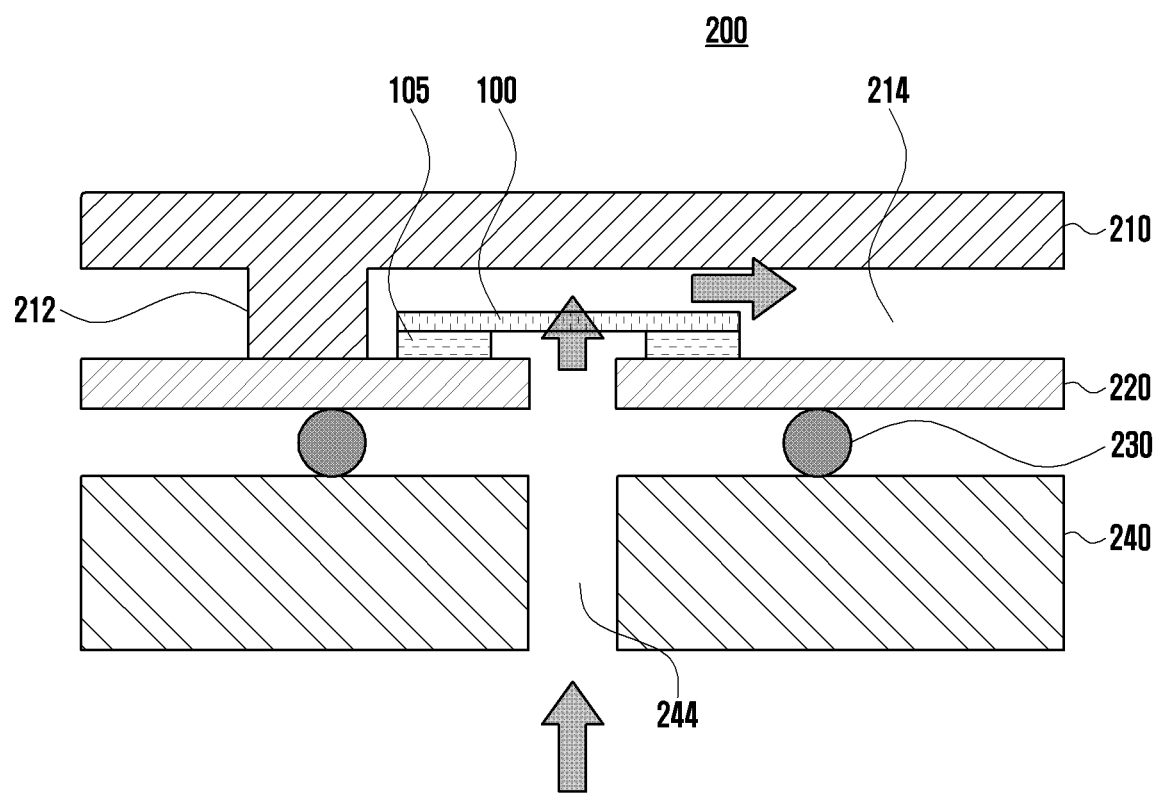
FIG. 5B is a view for explaining a moving direction of a fluid discharged to the lateral side of the compressing unit in the ventilation characteristic inspection apparatus 200 configured to attach an inspection object to the upper face of the seating unit according to one embodiment.

FIGS. 5A and 5B illustrate an apparatus that performs a ventilation characteristic inspection in the state in which an inspection object 100 is attached to the upper face of the seating unit 220, that is, the face of the seating part 220 facing the compressing unit 210.

According to various embodiments, the inspection object 100 may be attached to the upper face of the seating unit 220, which faces the compressing unit 210. For example, the inspection object 100 may be attached to the upper face of the seating unit 220 using the adhesive member 105 to correspond to the position of the through hole 222 of the seating unit 220. For example, when the injection object 100 is attached to the upper face of the seating unit 220 and the ventilation characteristic of the injection object 100 is inspected, it is possible to determine the ventilation characteristic of the electronic device 10 in the case in which the external pressure of the electronic device 10 is higher than the internal pressure.

According to various embodiments, the compressing unit 210 of the ventilation characteristic inspection apparatus 200 may include a protrusion 212 for effectively pressing one face of the seating unit 220 such that the seating unit 220 and the measurement unit 240 are brought into close contact with each other.

According to various embodiments, as illustrated in FIGS. 4A and 5A, the protrusion 212 of the compressing unit 210 may be formed in a closed loop shape such as a circular or quadrilateral shape. The compressing unit 210 may include a hole area 210 penetrating the upper and lower faces of the compressing unit 210 in order to serve as a fluid outlet.

Referring to FIG. 4A, for example, the fluid introduced from the measurement unit 240 may pass through the inspection object 100 via the hole area (fluid supply flow path) 244 of the measurement unit 240, and may move upwards along the through hole 222 of the seating unit 220 and the hole area (fluid discharge flow path) 214 of the compressing unit 210.

Referring to FIG. 5A, for example, the fluid introduced from the measurement unit 240 may pass through the inspection object 100 via the hole area (fluid supply flow path) 244 of the measurement unit 240 and the through hole 222 of the seating unit 220, and may move upwards along the hole area (fluid discharge flow path) 214 of the compressing unit 210.

According to another embodiment, as illustrated in FIGS. 4B and 5B, the compressing unit 210 may include a C-shaped (or ⌐-shaped or V-shaped) protrusion 212 so as to include an open area 214 serving as a fluid outlet at one side of the protrusion 212 of the compressing unit 210 instead of including the hole area penetrating the upper and lower faces thereof.

Referring to FIG. 4B, for example, the fluid introduced from the measurement unit 240 may pass through the inspection object 100 via the hole area (fluid supply flow path) 244 of the measurement unit 240, and may move along the through hole 222 of the seating unit 220 and a laterally open area (fluid discharge flow path) 214 of the protrusion 212 of the compressing unit 210.

Referring to FIG. 5B, for example, the fluid introduced from the measurement unit 240 may pass through the inspection object 100 via the hole area (fluid supply flow path) 244 of the measurement unit 240 and the through hole 222 of the seating unit 220, and may move along a laterally open area (fluid discharge flow path) 214 of the protrusion 212 of the compressing unit 210.

Figure 6:
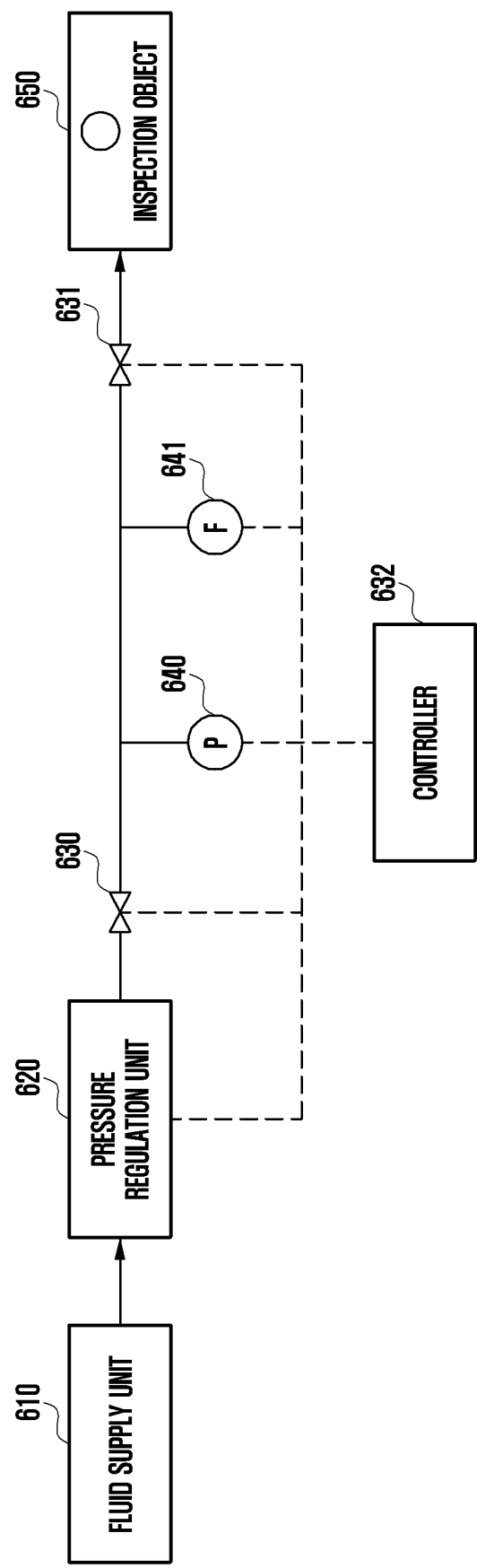
FIG. 6 is a view for explaining an operating method of a ventilation characteristic inspection apparatus 200 according to an embodiment.
Figure 7:
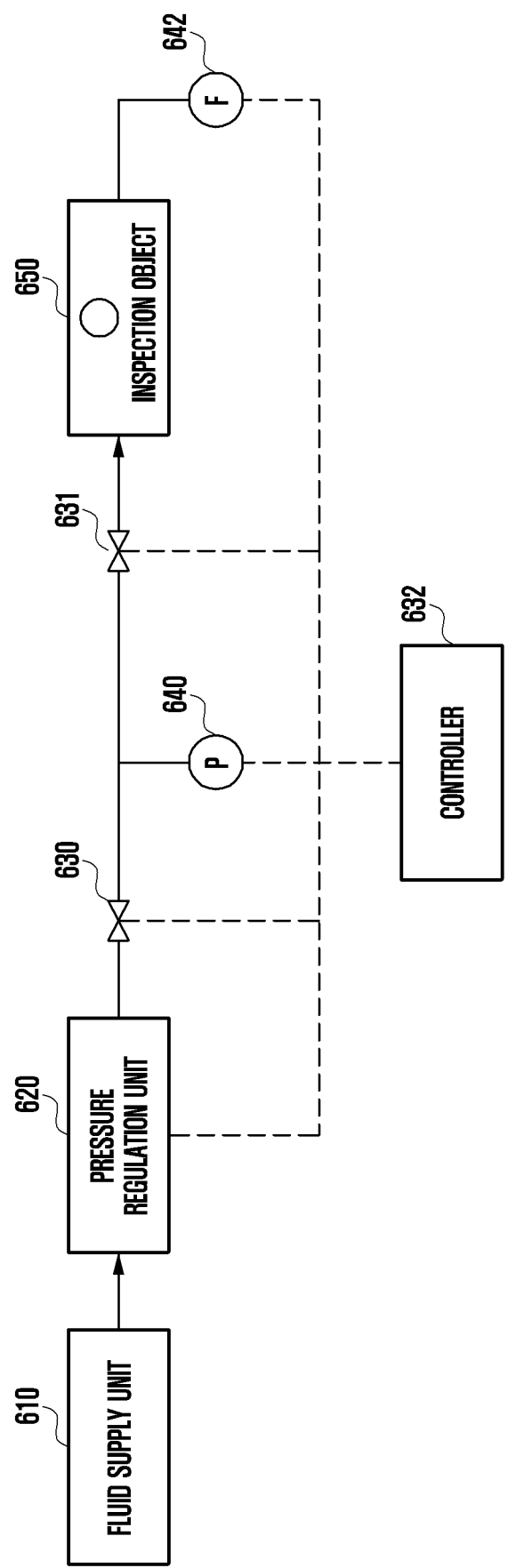
FIG. 7 is a view for explaining an operating method of a ventilation characteristic inspection apparatus 200 according to an embodiment.

FIGS. 6 and 7 are views for explaining an operating method of a ventilation characteristic inspection apparatus 200 according to various embodiments of the disclosure.

According to various embodiments, the measurement unit 240 may include a fluid supply unit (compressor) 610, a pressure regulation unit (regulator) 620, one or more switches 630 and 631, a pressure measurement unit 640, a flow rate measurement unit 641, and a controller 632.

According to an embodiment, the fluid supply unit 610 of the measurement unit 240 may supply a fluid into the ventilation characteristic inspection apparatus 200. For example, the fluid supply unit 610 may supply the fluid compressed to a predetermined pressure to the inside of the ventilation characteristic inspection apparatus 200 along the fluid supply flow path of the measurement unit 240 such that the fluid is capable of passing through the inspection object 650.

According to an embodiment, the fluid regulation unit 620 may regulate the pressure inside the ventilation characteristic inspection apparatus 200. For example, the pressure regulation unit 620 may regulate the pressure inside the ventilation characteristic inspection apparatus 200 by regulating the amount of the fluid supplied from the fluid supply unit 610.

According to an embodiment, the pressure measurement unit 640 may measure the pressure of the fluid passing through the inspection object 650. For example, the pressure measurement unit 640 may be disposed at a position between the pressure regulation unit 620 and the seating unit 220 to which the inspection object 650 is attached so as to measure the pressure of the fluid before the fluid passes through the inspection object 650.

According to an embodiment, the flow rate measurement unit 641 may measure the flow rate information of the fluid passing through the inspection object 650. For example, the flow rate information may include the volume of the fluid moving for a unit time.

According to various embodiments, the flow rate measurement unit 641 may measure at least one of the flow rate information of the fluid flowing into the inspection object 650 and the flow rate information of the fluid flowing out of the inspection object 650. For example, as illustrated in FIG. 6, the flow rate measurement unit 641 is disposed at a position between the pressure regulation unit 620 and the inspection object 650 so as to measure the flow rate information of the fluid before the fluid passes through the inspection object 650. As another example, as illustrated in FIG. 7, the flow rate measurement unit 641 may be disposed in an area in which the fluid flows after passing through the inspection object 650 so as to measure the flow rate information of the fluid after passing through the inspection object 650.

According to various embodiments, the ventilation characteristic inspection apparatus 200 may include one or more switches 630 and 631. According to an embodiment, the switches 630 and 631 may open/close the moving path of the fluid supplied to the ventilation characteristic inspection apparatus 200. For example, the measurement unit 240 may include a first switch 630 configured to open/close the fluid moving path between the pressure regulation unit 620 and the pressure measurement unit 640 and a second switch 631 configured to open/close the fluid moving path between the pressure measurement unit 640 and the inspection object 650. For example, the opening or closing operation of the switches 630 and 631 may be automatically controlled by the controller 632. For example, the switches 630 and 631 may be solenoid valves. The ventilation characteristic inspection apparatus 200 may regulate the pressure of the fluid to the required pressure or may remove an inspection measurement error caused by the pressure by properly opening or closing the switches 630 and 631.

According to various embodiments, the controller 632 may control the fluid supply unit 610, the pressure regulation unit 620, the switches 630 and 631, the pressure measurement unit 640, and the flow rate measurement unit 641 as a whole. For example, in order to provide a constant pressure of the fluid supplied to the inspection object 650, the controller 632 may first close the second switch 631 and open the first switch 630, and may then regulate the pressure of the supplied fluid using the pressure measurement unit 640 and the pressure regulation unit 620 to a set value. For example, the set value may be determined as an air pressure measurement value outside the ventilation characteristic inspection apparatus 200 during the inspection. As another example, in order to check the ventilation characteristic of the inspection object 650, the controller 632 may open the second switch 631 and may measure the pressure and flow rate information of the fluid flowing into the inspection object 650 using the pressure measurement unit 640 and the flow rate measurement unit 641. In this case, since the fluid flows only in the path passing through the inspection object 650 by the sealing unit 230 and the compressing unit 210, the pressure and flow rate information of the fluid to be measured may be determined as being caused only by the ventilation characteristic of the inspection object 650.

According to various embodiments, the controller 632 may determine whether or not the ventilation characteristic of the inspection object 650 is poor using the pressure and flow rate information measured by the pressure measurement unit 640 and the flow rate measurement unit 641. For example, the controller 632 may determine whether the ventilation characteristic is poor by comparing the measured flow rate information with a set flow rate information value.

According to various embodiments, the ventilation characteristic inspection apparatus 200 may further include a display (not illustrated). For example, the controller 632 may control the display to display at least one of the measured pressure and flow rate of the fluid and the result as to whether the ventilation characteristic is poor.

Figure 8:
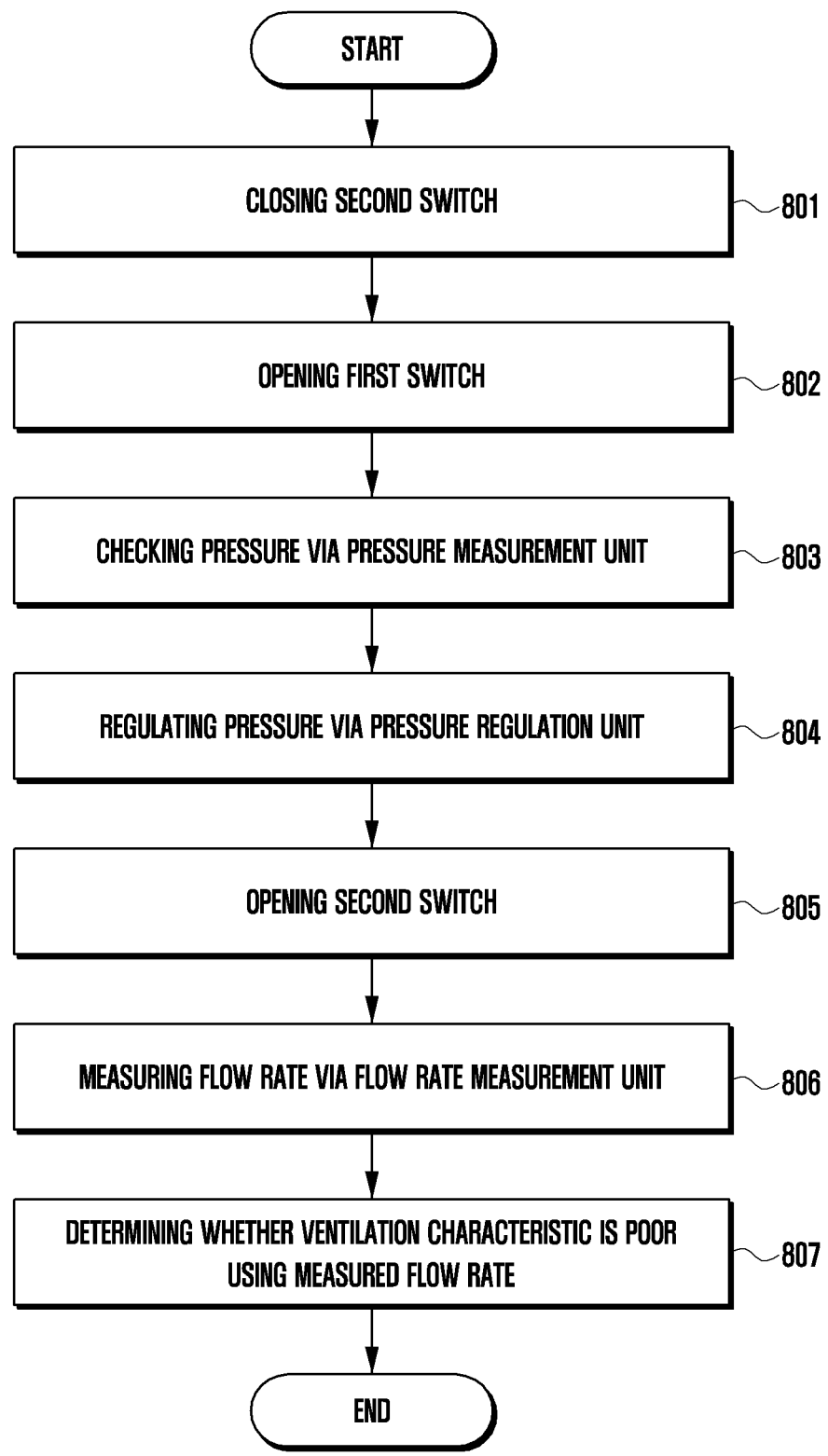
FIG. 8 is a flowchart of a ventilation characteristic inspection method according to various embodiments.

FIG. 8 is a flowchart of a ventilation characteristic inspection method according to an embodiment.

Referring to FIG. 8, in operation 801, the ventilation characteristic inspection apparatus 200 according to various embodiments may close the second switch 631 capable of opening/closing the fluid moving path between the pressure measurement unit 640 and the inspection object 650 in order to inspect the ventilation characteristic of the inspection object 650 attached to the seating unit 220 to be inspected.

In operation 802, the ventilation characteristic inspection apparatus 200 according to various embodiments may open the first switch 630 capable of opening/closing the fluid moving path between the pressure regulation unit 620 connected to the fluid supply unit 610 and the pressure measurement unit 640.

In operation 803, the ventilation characteristic inspection apparatus 200 according to various embodiments may measure the pressure of the fluid in the fluid moving path between the first switch 630 and the second switch 640 using the pressure measurement unit 640. For example, the ventilation characteristic inspection apparatus 200 may determine whether the measured pressure value of the fluid is an appropriate pressure value by comparing the measured pressure value with a set pressure value or the measured value of the external air pressure in the inspection environment.

In operation 804, the ventilation characteristic inspection apparatus 200 according to various embodiments may regulate the pressure using the pressure regulation unit 620 such that the pressure of the fluid in the fluid moving path between the first switch 630 and the second switch 640 has the set pressure value or the measured value of the external air pressure. For example, when the measured fluid pressure value is lower than the set value, the pressure controller 620 may regulate the pressure by supplying a fluid from the fluid supply unit 610 that supplies a fluid compressed to a predetermined pressure level.

In operation 805, the ventilation characteristic inspection apparatus 200 according to various embodiments may open the second switch 631 so as to allow the fluid to pass through the inspection object 650. For example, the fluid may flow only through a path passing through the inspection object 650 without leaking to the outside by the sealing unit 230 and the compressing unit 210 of the ventilation characteristic inspection apparatus 200.

In operation 806, the flow rate measurement unit 641 may measure the flow rate information of the fluid passing through the inspection object 650. For example, the flow rate measurement unit 641 may be disposed in the fluid moving path between the second switch 631 and the inspection object 650 so as to measure the flow rate information of the fluid before the fluid passes through the inspection object 650. As another example, the flow rate measurement unit 641 may be disposed in the fluid discharge path in which the fluid moves after passing through the inspection object 650 so as to measure the flow rate information of the fluid after passing through the inspection object 650.

According to an embodiment, the flow rate information may include the volume of the fluid moving for a unit time. According to another embodiment, the flow rate information may include time information required to reach a specific pressure. For example, the flow rate information may further include a pressure change value measured using the pressure measurement unit 640.

In operation 807, the ventilation characteristic inspection apparatus 200 according to various embodiments may determine whether the ventilation characteristic of the inspection object 650 is poor on the basis of the measured flow rate information. For example, when the measured flow rate information of the inspection object 650 has a difference in error range or more compared with the set flow rate information, the ventilation characteristics of the inspection object 650 may be determined as poor.

An inspection apparatus according to various embodiments of the disclosure may include: a seating unit configured to attach an inspection object thereto, and including a lower face, an upper face facing in a direction opposite the lower face, and at least one through-hole passing through the lower face and the upper face; a measurement unit including a groove configured to accommodate at least a portion of the seating unit including the lower face of the seating unit, and a fluid supply flow path configured to supply a fluid in a direction facing the inspection object attached to the seating unit; and a compressing unit disposed to apply a pressing pressure to the seating unit at a position facing the upper face of the seating unit, and including a fluid discharge flow path such that a fluid supplied from the measurement unit is discharged through the injection object.

According to various embodiments, the inspection apparatus may further include a sealing unit, and the sealing unit may be disposed between the seating unit and the measurement unit, and may bring the seating unit and the measurement unit into close contact with each other such that the fluid supplied from the measurement unit does not leak into an area other than the through hole in the seating unit.

For example, the compressing unit may further include a protrusion protruding in a direction facing the upper face of the seating unit.

For example, the protrusion may be formed in a C shape corresponding to the through hole in the seating unit, and a fluid passing through the inspection object may move along the through hole and the C-shaped protrusion.

For example, the compressing unit may further include a hole area through which a fluid passing through the inspection object is capable of being discharged to correspond to the through hole in the seating unit.

In the inspection apparatus according to various embodiments, the measurement unit may include a flow rate measurement unit, and the flow rate measurement unit may measure at least one of flow rate information of a fluid flowing into the inspection object and flow rate information of a fluid flowing out of the inspection object.

In the inspection apparatus according to various embodiments, the measurement unit may further include a pressure regulation unit and a pressure measurement unit, the pressure regulation unit may regulate the pressure inside the inspection apparatus, and the pressure measurement unit may measure the pressure of a fluid flowing into the inspection object.

For example, the measurement unit may further include a fluid supply unit configured to supply a fluid compressed to a predetermined pressure level into the inspection apparatus, and one or more switches configured to open and close a moving path of the supplied fluid.

For example, the switches may include a first switch configured to open and close a fluid moving path between the pressure regulation unit and the pressure measurement unit, and a second switch configured to open and close a fluid moving path between the pressure measurement unit and the inspection object.

In the inspection apparatus according to various embodiments, the measurement unit may further include a controller, and the controller may be configured to execute: a first step in which the second switch is closed, the first switch is opened, and the pressure measured by the pressure measurement unit is regulated to a preset value by regulating an amount of the fluid supplied from the fluid supply unit through the pressure regulation unit; and a second step in which the second switch is opened and a pressure and a flow rate of the fluid flowing into the inspection object are measured using the pressure measurement unit and the flow rate measurement unit.

For example, the controller may determine whether the ventilation characteristic of the inspection object is poor based on the measured pressure and flow rate of the fluid.

According to various embodiments, the inspection apparatus may further include a display, and the controller may control the display to display at least one of the measured pressure and flow rate of the fluid and a result as to whether the ventilation characteristic is poor.

According to various embodiments, the inspection object may be attached to the lower face of the seating unit to correspond to the through hole in the seating unit.

According to another embodiment, the inspection object may be attached to the upper face of the seating unit to correspond to the through hole in the seating unit.

According to various embodiments, the measurement unit may further include a sealing groove configured to guide the position of the sealing unit in one face thereof facing the seating part.

According to various embodiments, a ventilation inspection method may include: closing a second switch configured to open/close a fluid moving path between a pressure measurement unit and the inspection object, and opening a first switch configured to open/close a fluid moving path between a pressure measurement unit and the pressure regulation unit; measuring a pressure of a fluid in the fluid moving paths using the pressure measurement unit; regulating the pressure measured by the pressure measurement unit to a preset value by regulating an amount of the fluid supplied from the fluid supply unit through the pressure regulation unit; opening the second switch and measuring a pressure and a flow rate of the fluid flowing into the inspection object using the pressure measurement unit and the flow rate measurement unit; and determining whether the inspection object is poor using measured values of the pressure and the flow rate of the fluid flowing into the inspection object.

For example, the flow rate measurement unit may be disposed on a moving path of a fluid passing through the inspection object, and may measure the flow rate of a fluid flowing out of the inspection object.

For example, the ventilation inspection method may further include determining whether a ventilation characteristic of the inspection object is poor by comparing the measured pressure and flow rate of the fluid with a preset value.

For example, the ventilation inspection method may further include displaying at least one of the measured pressure and flow rate of the fluid, and a result as to whether the ventilation characteristic is poor.

For example, the fluid supplied from the fluid supply unit may pass through the inspection object attached to the seating unit and may move along a fluid discharge flow path included in the compressing unit disposed to apply a pressing pressure to the seating unit.

The term "module" as used herein may, for example, mean a unit including one of hardware, software, and firmware or a combination of two or more of them. The "module" may be interchangeably used with, for example, the term "unit", "logic", "logical block", "component", or "circuit". A "unit" or "module" may be a minimum unit of an integrally configured component or a portion thereof, or may be a minimum unit that performs one or more functions or a portion thereof. The "unit" or "module" may be implemented mechanically or electronically. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

The embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. An inspection apparatus comprising:
a seating unit configured to attach an inspection object thereto, and comprising a lower face, an upper face facing in a first direction opposite the lower face, and at least one through-hole passing through the lower face and the upper face;
a measurement unit comprising a groove configured to accommodate at least a portion of the seating unit including the lower face of the seating unit, and a fluid supply flow path configured to supply a fluid in the first direction facing the inspection object attached to the seating unit; and
a compressing unit disposed to apply a pressing pressure to the seating unit at a position facing the upper face of the seating unit, and comprising a fluid discharge flow path such that a fluid supplied from the measurement unit is discharged through the inspection object,
wherein the compressing unit further comprises a protrusion protruding in a second direction facing the upper face of the seating unit, the protrusion formed in a C shape corresponding to the at least one through-hole in the seating unit, and the C shape having an opening facing a third direction perpendicular to the first direction and the second direction.

2. The inspection apparatus of claim 1, further comprising:
a sealing unit disposed between the seating unit and the measurement unit, and configured to contact the seating unit and the measurement unit such that the fluid supplied from the measurement unit does not leak into an area other than the at least one through-hole in the seating unit.

3. The inspection apparatus of claim 1, wherein
a fluid passing through the inspection object moves along the at least one through-hole and the C-shaped protrusion, and is discharged through the opening.

4. The inspection apparatus of claim 1, wherein the compressing unit further comprises a hole area through which a fluid passing through the inspection object is capable of being discharged to correspond to the at least one through hole in the seating unit.

5. The inspection apparatus of claim 1, further comprising a flow rate measurement unit, and
wherein the flow rate measurement unit measures at least one of flow rate information of a fluid flowing into the inspection object and flow rate information of a fluid flowing out of the inspection object.

6. The inspection apparatus of claim 1, further comprising a pressure regulation unit and a pressure measurement unit,
wherein the pressure regulation unit regulates a pressure inside the inspection apparatus, and
wherein the pressure measurement unit measures a pressure of a fluid flowing into the inspection object.

7. The inspection apparatus of claim 6, further comprising:
a fluid supply unit configured to supply a fluid compressed to a predetermined pressure level into the inspection apparatus; and
one or more switches configured to open and close a moving path of the supplied fluid.

8. The inspection apparatus of claim 7, wherein the one or more switches comprise:
a first switch configured to open and close a fluid moving path between the pressure regulation unit and the pressure measurement unit; and
a second switch configured to open and close a fluid moving path between the pressure measurement unit and the inspection object.

9. The inspection apparatus of claim 8, further comprising a controller, and
wherein the controller is configured to execute:
a first step in which the second switch is closed, the first switch is opened, and the pressure measured by the pressure measurement unit is regulated to a preset value by regulating an amount of the fluid supplied from the fluid supply unit through the pressure regulation unit; and
a second step in which the second switch is opened and a pressure and a flow rate of the fluid flowing into the inspection object are measured using the pressure measurement unit and a flow rate measurement unit.

10. The inspection apparatus of claim 1, wherein the inspection object is attached to the lower face of the seating unit to correspond to the at least one through-hole in the seating unit.

* * * * *